US012732387B2

(12) United States Patent
Fung et al.

(10) Patent No.: US 12,732,387 B2
(45) Date of Patent: Sep. 8, 2026

(54) BOT PERMISSIONS

(71) Applicant: Google LLC, Mountain View, CA (US)

(72) Inventors: Shelbian Fung, Mountain View, CA (US); Richard Dunn, Mountain View, CA (US); Anton Volkov, Mountain View, CA (US); Adam Rodriguez, Mountain View, CA (US)

(73) Assignee: Google LLC, Mountain View, CA (US)

(*) Notice: Subject to any disclaimer, the term of this patent is extended or adjusted under 35 U.S.C. 154(b) by 32 days.

(21) Appl. No.: 18/921,622

(22) Filed: Oct. 21, 2024

(65) Prior Publication Data

US 2025/0047508 A1 Feb. 6, 2025

Related U.S. Application Data

(63) Continuation of application No. 18/327,459, filed on Jun. 1, 2023, now Pat. No. 12,126,739, which is a (Continued)

(51) Int. Cl.
*H04L 9/32* (2006.01)
*H04L 9/40* (2022.01)

(52) U.S. Cl.
CPC ............ *H04L 9/3271* (2013.01); *H04L 63/10* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 5,963,649 | A | 10/1999 | Sako |
| 6,092,102 | A | 7/2000 | Wagner |

(Continued)

FOREIGN PATENT DOCUMENTS

| | | |
|---|---|---|
| CN | 1475908 | 2/2004 |
| CN | 102222079 | 10/2011 |

(Continued)

OTHER PUBLICATIONS

"Examination Report", AU Application No. 2015214298, Apr. 24, 2017, 3 pages.

(Continued)

*Primary Examiner* — Bradley W Holder
(74) *Attorney, Agent, or Firm* — Colby Nipper PLLC

(57) ABSTRACT

Permission control and management for messaging application bots is described. A method can include providing a messaging application, on a first computing device associated with a first user, to enable communication between the first user and another user, and detecting, at the messaging application, a user request. The method can also include programmatically determining that an action in response to the user request requires access to data associated with the first user, and causing a permission interface to be rendered in the messaging application, the permission interface enabling the first user to approve or prohibit access to the data associated with the first user. The method can include accessing the data associated with the first user and performing the action in response to the user request, upon receiving user input from the first user indicating approval of the access to the data associated with the first user.

114 Claims, 9 Drawing Sheets

Related U.S. Application Data continuation of application No. 17/732,778, filed on Apr. 29, 2022, now Pat. No. 11,700,134, which is a continuation of application No. 16/695,967, filed on Nov. 26, 2019, now Pat. No. 11,336,467, which is a continuation of application No. 15/709,440, filed on Sep. 19, 2017, now Pat. No. 10,511,450.

(60) Provisional application No. 62/397,047, filed on Sep. 20, 2016.

(56) References Cited

U.S. PATENT DOCUMENTS

D599,363 S 9/2009 Mays
7,603,413 B1 10/2009 Herold et al.
D611,053 S 3/2010 Kanga et al.
D624,927 S 10/2010 Allen et al.
D648,343 S 11/2011 Chen
D648,735 S 11/2011 Arnold et al.
D651,609 S 1/2012 Pearson et al.
D658,201 S 4/2012 Gleasman et al.
D658,677 S 5/2012 Gleasman et al.
D658,678 S 5/2012 Gleasman et al.
D673,172 S 12/2012 Peters et al.
8,391,618 B1 3/2013 Chuang et al.
8,423,577 B1 4/2013 Lee et al.
8,515,958 B2 8/2013 Knight
8,554,701 B1 10/2013 Dillard et al.
8,589,407 B2 11/2013 Bhatia
D695,755 S 12/2013 Hwang et al.
D699,739 S 2/2014 Voreis et al.
D699,744 S 2/2014 Ho Kushner et al.
8,645,697 B1 2/2014 Emigh et al.
8,650,210 B1 2/2014 Cheng et al.
D701,228 S 3/2014 Lee
D701,527 S 3/2014 Brinda et al.
D701,528 S 3/2014 Brinda et al.
8,688,698 B1 4/2014 Black et al.
8,700,480 B1 4/2014 Fox et al.
D704,726 S 5/2014 Maxwell
D705,244 S 5/2014 Arnold et al.
D705,251 S 5/2014 Pearson et al.
D705,802 S 5/2014 Kerr et al.
D706,802 S 6/2014 Myung et al.
8,825,474 B1 9/2014 Zhai et al.
D714,821 S 10/2014 Chand et al.
D716,338 S 10/2014 Lee
8,938,669 B1 1/2015 Cohen
8,996,639 B1 3/2015 Faaborg et al.
9,020,956 B1 4/2015 Barr et al.
9,191,786 B2 11/2015 Davis
9,213,941 B2 12/2015 Petersen
9,230,241 B1 1/2016 Singh et al.
9,262,517 B2 2/2016 Feng et al.
9,467,435 B1 10/2016 Tyler et al.
9,560,152 B1 1/2017 Jamdar et al.
9,674,120 B2 6/2017 Davis
9,715,496 B1 7/2017 Sapoznik et al.
9,805,371 B1 10/2017 Sapoznik et al.
9,807,037 B1 10/2017 Sapoznik et al.
9,817,813 B2 11/2017 Faizakof et al.
9,973,705 B2 5/2018 Kinugawa et al.
10,146,748 B1 12/2018 Barndollar et al.
11,336,467 B2 5/2022 Fung et al.
11,700,134 B2 7/2023 Fung et al.
12,126,739 B2 10/2024 Fung et al.
2002/0040297 A1 4/2002 Tsiao et al.
2002/0103837 A1 8/2002 Balchandran et al.
2003/0105589 A1 6/2003 Liu et al.
2003/0182374 A1 9/2003 Haldar
2006/0021023 A1 1/2006 Stewart et al.
2006/0029106 A1 2/2006 Ott et al.
2006/0150119 A1 7/2006 Chesnais et al.
2006/0156209 A1 7/2006 Matsuura et al.
2006/0172749 A1 8/2006 Sweeney
2007/0030364 A1 2/2007 Obrador et al.
2007/0094217 A1 4/2007 Ronnewinkel
2007/0162942 A1 7/2007 Hamynen et al.
2007/0244980 A1 10/2007 Baker et al.
2008/0086522 A1* 4/2008 Biggs .................. H04L 63/0245 709/202
2008/0114837 A1* 5/2008 Biggs .................... G06F 40/279 704/9
2008/0120371 A1 5/2008 Gopal
2008/0153526 A1 6/2008 Othmer
2008/0189367 A1 8/2008 Okumura
2009/0076795 A1 3/2009 Bagalore et al.
2009/0119584 A1 5/2009 Herbst
2009/0282114 A1 11/2009 Feng et al.
2010/0077029 A1 3/2010 Shook et al.
2010/0228590 A1 9/2010 Muller et al.
2010/0260426 A1 10/2010 Huang et al.
2011/0074685 A1 3/2011 Causey et al.
2011/0107223 A1 5/2011 Tilton et al.
2011/0164163 A1 7/2011 Bilbrey et al.
2011/0252108 A1 10/2011 Morris et al.
2012/0030289 A1 2/2012 Buford et al.
2012/0033876 A1 2/2012 Momeyer et al.
2012/0041941 A1 2/2012 King et al.
2012/0041973 A1 2/2012 Kim et al.
2012/0042036 A1 2/2012 Lau et al.
2012/0089847 A1 4/2012 Tu et al.
2012/0096097 A1 4/2012 Morinaga et al.
2012/0131520 A1 5/2012 Tang et al.
2012/0179717 A1 7/2012 Kennedy et al.
2012/0224743 A1 9/2012 Rodriguez et al.
2012/0239761 A1 9/2012 Linner et al.
2012/0245944 A1 9/2012 Gruber et al.
2012/0278164 A1 11/2012 Spivack et al.
2013/0036162 A1 2/2013 Koenigs
2013/0050507 A1 2/2013 Syed et al.
2013/0061148 A1 3/2013 Das et al.
2013/0073366 A1 3/2013 Heath
2013/0144961 A1 6/2013 Park et al.
2013/0260727 A1 10/2013 Knudson et al.
2013/0262574 A1 10/2013 Cohen
2013/0346235 A1 12/2013 Lam
2014/0004889 A1 1/2014 Davis
2014/0012927 A1 1/2014 Gertzfield et al.
2014/0035846 A1 2/2014 Lee et al.
2014/0047413 A1 2/2014 Sheive et al.
2014/0067371 A1 3/2014 Liensberger
2014/0088954 A1 3/2014 Shirzadi et al.
2014/0108562 A1 4/2014 Panzer
2014/0150068 A1 5/2014 Janzer
2014/0163954 A1 6/2014 Joshi et al.
2014/0164506 A1 6/2014 Tesch et al.
2014/0164953 A1 6/2014 Lynch et al.
2014/0171133 A1 6/2014 Stuttle et al.
2014/0189027 A1 7/2014 Zhang et al.
2014/0189538 A1 7/2014 Martens et al.
2014/0195621 A1 7/2014 Rao Dv
2014/0201675 A1 7/2014 Joo et al.
2014/0228009 A1 8/2014 Chen et al.
2014/0237057 A1 8/2014 Khodorenko
2014/0317030 A1 10/2014 Shen et al.
2014/0337438 A1 11/2014 Govande et al.
2014/0344058 A1 11/2014 Brown
2014/0372349 A1 12/2014 Driscoll
2015/0006143 A1 1/2015 Skiba et al.
2015/0032724 A1 1/2015 Thirugnanasundaram et al.
2015/0058720 A1 2/2015 Smadja et al.
2015/0088998 A1 3/2015 Isensee et al.
2015/0095855 A1 4/2015 Bai et al.
2015/0100537 A1 4/2015 Grieves et al.
2015/0171133 A1 6/2015 Kim et al.
2015/0178371 A1 6/2015 Seth et al.
2015/0178388 A1 6/2015 Winnemoeller et al.
2015/0207765 A1 7/2015 Brantingham et al.
2015/0227797 A1 8/2015 Ko et al.
2015/0244653 A1 8/2015 Niu et al.
2015/0248411 A1 9/2015 Krinker et al.
2015/0250936 A1 9/2015 Thomas et al.
2015/0286371 A1 10/2015 Degani

(56) References Cited

U.S. PATENT DOCUMENTS

2015/0288633 A1 10/2015 Ogundokun et al.
2015/0302301 A1 10/2015 Petersen
2015/0347769 A1 12/2015 Espinosa et al.
2015/0350117 A1 12/2015 Bastide et al.
2016/0037311 A1 2/2016 Cho
2016/0042252 A1 2/2016 Sawhney et al.
2016/0043974 A1 2/2016 Purcell et al.
2016/0065519 A1 3/2016 Waltermann et al.
2016/0072737 A1 3/2016 Forster
2016/0140447 A1 5/2016 Cohen et al.
2016/0140477 A1 5/2016 Karanam et al.
2016/0162791 A1 6/2016 Petersen
2016/0179816 A1 6/2016 Glover
2016/0210279 A1 7/2016 Kim et al.
2016/0224524 A1 8/2016 Kay et al.
2016/0226804 A1 8/2016 Hampson et al.
2016/0234553 A1 8/2016 Hampson et al.
2016/0283454 A1 9/2016 Leydon et al.
2016/0284011 A1 9/2016 Dong et al.
2016/0342895 A1 11/2016 Gao et al.
2016/0350304 A1 12/2016 Aggarwal et al.
2016/0352656 A1 12/2016 Galley et al.
2016/0378080 A1 12/2016 Uppala et al.
2017/0075878 A1 3/2017 Jon et al.
2017/0093769 A1 3/2017 Lind et al.
2017/0098122 A1 4/2017 El Kaliouby et al.
2017/0118152 A1 4/2017 Lee
2017/0134316 A1 5/2017 Cohen et al.
2017/0142046 A1 5/2017 Mahmoud et al.
2017/0149703 A1 5/2017 Willett et al.
2017/0153792 A1 6/2017 Kapoor et al.
2017/0171117 A1 6/2017 Carr et al.
2017/0180276 A1 6/2017 Gershony et al.
2017/0180294 A1 6/2017 Milligan et al.
2017/0187654 A1 6/2017 Lee
2017/0250930 A1 8/2017 Ben-itzhak
2017/0250935 A1 8/2017 Rosenberg
2017/0250936 A1* 8/2017 Rosenberg .............. H04L 51/02
2017/0293834 A1 10/2017 Raison et al.
2017/0308589 A1 10/2017 Liu et al.
2017/0324868 A1 11/2017 Tamblyn et al.
2017/0339076 A1 11/2017 Patil
2017/0344224 A1 11/2017 Kay et al.
2017/0357442 A1 12/2017 Peterson et al.
2018/0004397 A1 1/2018 Mazzocchi
2018/0005272 A1 1/2018 Todasco et al.
2018/0005288 A1* 1/2018 Delaney ............... G06Q 20/102
2018/0012231 A1 1/2018 Sapoznik et al.
2018/0013699 A1 1/2018 Sapoznik et al.
2018/0060705 A1 3/2018 Mahmoud et al.
2018/0083894 A1 3/2018 Fung et al.
2018/0083898 A1 3/2018 Pham
2018/0083901 A1 3/2018 Mcgregor et al.
2018/0090135 A1 3/2018 Schlesinger et al.
2018/0137097 A1 5/2018 Su-min et al.
2018/0196854 A1 7/2018 Burks
2018/0210874 A1 7/2018 Fuxman et al.
2018/0293601 A1 10/2018 Glazier
2018/0309706 A1 10/2018 Yu-na et al.
2018/0316637 A1 11/2018 Desjardins
2018/0322403 A1 11/2018 Ron et al.
2018/0336226 A1 11/2018 Anorga et al.
2018/0336415 A1 11/2018 Anorga et al.
2018/0367483 A1 12/2018 Rodriguez et al.
2018/0367484 A1 12/2018 Rodriguez et al.
2018/0373683 A1 12/2018 Hullette et al.
2020/0099538 A1 3/2020 Fung et al.
2022/0255760 A1 8/2022 Fung et al.
2023/0379173 A1 11/2023 Fung et al.

FOREIGN PATENT DOCUMENTS

CN 102395966 3/2012
CN 102467574 5/2012
CN 103226949 7/2013
CN 103548025 1/2014
CN 104951428 9/2015
CN 105068661 11/2015
CN 105141503 12/2015
CN 105306281 2/2016
CN 105830104 8/2016
EP 1376392 1/2004
EP 1394713 3/2004
EP 2523436 11/2012
EP 2560104 2/2013
EP 2688014 1/2014
EP 2703980 3/2014
EP 3091445 11/2016
JP 2002132804 5/2002
JP 2014086088 5/2014
JP 2014142919 8/2014
KR 20110003462 1/2011
KR 20130008036 1/2013
KR 20130061387 6/2013
WO 2004104758 12/2004
WO 2011002989 1/2011
WO 2015183493 12/2015
WO 2016130788 8/2016
WO 2018039092 A1 3/2018
WO 2018089109 5/2018

OTHER PUBLICATIONS

"Examination Report", AU Application No. 2015214298, Nov. 2, 2017, 3 pages.
"Extended European Search Report", EP Application No. 15746410.8, Sep. 5, 2017, 7 pages.
"Final Office Action", U.S. Appl. No. 16/999,702, filed Feb. 1, 2022, 15 pages.
"Final Office Action", U.S. Appl. No. 15/386,760, filed May 30, 2019, 12 pages.
"Final Office Action", U.S. Appl. No. 15/386,162, filed Jun. 5, 2019, 12 pages.
"Final Office Action", U.S. Appl. No. 15/238,304, filed Nov. 23, 2018, 13 pages.
"First Action Interview Office Action", U.S. Appl. No. 15/624,637, filed Jan. 25, 2019, 3 pages.
"First Action Interview Office Action", U.S. Appl. No. 15/386,760, filed Jan. 30, 2019, 4 pages.
"First Action Interview Office Action", U.S. Appl. No. 16/999,702, filed Sep. 28, 2021, 3 pages.
"First Action Interview Office Action", U.S. Appl. No. 16/695,967, filed Sep. 30, 2021, 4 pages.
"First Action Interview Office Action", U.S. Appl. No. 15/350,040, filed Oct. 30, 2018, 4 pages.
"First Action Interview Office Action", U.S. Appl. No. 16/003,661, filed Dec. 14, 2018, 12 pages.
"Foreign Notice of Allowance", CN Application No. 201680070359.3, Jul. 5, 2021, 4 pages.
"Foreign Notice of Allowance", CN Application No. 201780056982.8, Jul. 13, 2021, 4 pages.
"Foreign Notice of Allowance", KR Application No. 10-2019-7020465, Aug. 5, 2020, 5 pages.
"Foreign Notice of Allowance", JP Application No. 2018-532399, Sep. 23, 2020, 2 pages.
"Foreign Office Action", KR Application No. 10-2018-7019756, Jan. 17, 2020, 8 pages.
"Foreign Office Action", JP Application No. 2018-532399, Mar. 10, 2020, 9 pages.
"Foreign Office Action", EP Application No. 16825663.4, Apr. 16, 2019, 5 pages.
"Foreign Office Action", EP Application No. 16825666.7, Apr. 23, 2019, 6 pages.
"Foreign Office Action", KR Application No. 10-2019-7011687, May 7, 2019, 5 pages.
"Foreign Office Action", KR Application No. 10-2018-7013953, May 8, 2019, 8 pages.
"Foreign Office Action", KR Application No. 10-2018-7019756, May 13, 2019, 17 pages.

(56) References Cited

OTHER PUBLICATIONS

"Foreign Office Action", CN Application No. 201680070359.3, Jun. 3, 2020, 22 pages.
"Foreign Office Action", KR Application No. 10-2018-7013953, Jun. 13, 2019, 8 pages.
"Foreign Office Action", JP Application No. 2018-532399, Jun. 16, 2020, 5 pages.
"Foreign Office Action", IN Application No. 201847014172, Jun. 17, 2020, 7 pages.
"Foreign Office Action", EP Application No. 16825666.7, Jun. 18, 2020, 6 pages.
"Foreign Office Action", KR Application No. 10-2019-7020465, Jun. 29, 2020, 7 pages.
"Foreign Office Action", JP Application No. 2018-532399, Jul. 23, 2019, 12 pages.
"Foreign Office Action", KR Application No. 10-2018-7013953, Oct. 29, 2018, 10 pages.
"Foreign Office Action", CN Application No. 201580016692.1, Nov. 2, 2018, 16 pages.
"Foreign Office Action", CN Application No. 201780056982.8, Nov. 19, 2020, 22 pages.
"Intent to Grant", EP Application No. 16825666.7, Oct. 18, 2021, 6 pages.
"International Preliminary Report on Patentability", Application No. PCT/US2017/046858, Feb. 19, 2019, 7 pages.
"International Preliminary Report on Patentability", Application No. PCT/US2017/052349, Mar. 26, 2019, 7 pages.
"International Preliminary Report on Patentability", Application No. PCT/US2016/068083, Jun. 26, 2018, 10 pages.
"International Preliminary Report on Patentability", Application No. PCT/US2017/052333, Dec. 4, 2018, 15 pages.
"International Preliminary Report on Patentability", Application No. PCT/US2018/022501, Dec. 17, 2019, 7 pages.
"International Search Report", Application No. PCT/US2017/057044, Jan. 18, 2018, 5 pages.
"International Search Report", Application No. PCT/US2018/022501, May 14, 2018, 4 pages.
"International Search Report", Application No. PCT/US2018/022503, Aug. 16, 2018, 6 pages.
"International Search Report", Application No. PCT/US2017/052713, Dec. 5, 2017, 4 pages.
"International Search Report", Application No. PCT/US2017/052349, Dec. 13, 2017, 5 pages.
"International Search Report and Written Opinion", Application No. PCT/US2016/068083, Mar. 9, 2017, 13 pages.
"International Search Report and Written Opinion", Application No. PCT/US2015/014414, May 11, 2015, 8 pages.
"International Search Report and Written Opinion", Application No. PCT/US2018/021028, Jun. 15, 2018, 11 pages.
"International Search Report and Written Opinion", Application No. PCT/US2017/046858, Oct. 11, 2017, 10 pages.
"International Search Report and Written Opinion", Application No. PCT/US2017/052333, Nov. 30, 2017, 15 pages.
"Foreign Office Action", DE Application No. 112017003594.5, Jun. 25, 2025, 15 pages.

* cited by examiner

BOT PERMISSIONS

CROSS-REFERENCE TO RELATED APPLICATIONS

This application is a continuation of U.S. patent application Ser. No. 18/327,459, filed Jun. 1, 2023, which is a continuation of U.S. patent application Ser. No. 17/732,778, filed Apr. 29, 2022, now U.S. Pat. No. 11,700,134, issued Jul. 11, 2023, which is a continuation of U.S. patent application Ser. No. 16/695,967, filed Nov. 26, 2019, now U.S. Pat. No. 11,336,467, issued May 17, 2022, which is a continuation of U.S. patent application Ser. No. 15/709,440, filed Sep. 19, 2017, now U.S. Pat. No. 10,511,450, issued Dec. 17, 2019, which claims the benefit of U.S. Provisional Application No. 62/397,047, filed Sep. 20, 2016, all of which are incorporated herein by reference in their entireties.

BACKGROUND

Users conduct messaging conversations, e.g., chat, instant message, etc. using messaging services. Messaging conversations may be conducted using any user device, e.g., a computer, a mobile device, a wearable device, etc. As users conduct more conversations and perform more tasks using messaging applications, automated assistance with messaging conversations or tasks (e.g., via a bot or other automated assistant application) may be useful to improve efficiency. While automation may help make messaging communications more efficient for users, there may be a need to manage permissions relating to when and how a messaging bot accesses user information and what user information the messaging bot is permitted to access.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method comprising providing a messaging application, on a first computing device associated with a first user, to enable communication between the first user and at least one other user, and detecting, at the messaging application, a user request. The method can also include programmatically determining that an action in response to the user request requires access to data associated with the first user, and causing a permission interface to be rendered in the messaging application on the first computing device, the permission interface enabling the first user to approve or prohibit the access to the data associated with the first user. The method can further include upon receiving user input from the first user indicating approval of the access to the data associated with the first user, accessing the data associated with the first user and performing the action in response to the user request.

The method can also include upon receiving user input from the first user prohibiting the access to the data associated with the first user, providing an indication in the messaging application that the task is not performed. In some implementations the first user can include a human user and the at least one other user can include an assistive agent.

In some implementations, the first user is a human user and the at least one other user includes a second human user, different from the first user, associated with a second computing device. The permission interface can be rendered in the messaging application on the first computing device associated with the first user and the permission interface is not displayed on the second computing device associated with the second human user.

The method can further include, upon receiving user input from the first user prohibiting access of the data associated with the first user, providing a first indication for rendering on the first computing device associated with the first user. The method can also include providing a second indication for rendering on a second computing device associated with the at least one other user, the first and second indications indicating failure to serve the user request, wherein the first and second indications are different.

In some implementations, the first and second indications can include have one or more of: different textual content, different style, and different format. In some implementations, the first user includes a human user and the at least one other user includes a second human user, different from the first user and an assistive agent. The user request can be received from the first computing device associated with the first user. The method can also include initiating, in response to the user request, a separate conversation in the messaging application. The separate conversation can include the first user and the assistive agent, and may not include the second human user.

In some implementations, detecting the user request comprises analyzing one or more messages received in the messaging application from one or more of the first user and the at least one other user. The one or more messages can include one or more of a text message, a multimedia message, and a command to an assistive agent. Performing the action in response to the user request can include providing one or more suggestions to the first messaging application.

The method can also include causing the one or more suggestions to be rendered in the messaging application. The one or more suggestions can be rendered as suggestion elements that, when selected by the first user, cause details about the suggestion to be displayed.

Some implementations can include a computer-implemented method. The method can include detecting, at a messaging application, a user request, and programmatically determining that an action in response to the user request requires access to data associated with the first user. The method can also include causing a permission interface to be rendered in the messaging application on the first computing device, the permission interface enabling the first user to approve or prohibit the access to the data associated with the first user. The method can further include upon receiving approval from the first user at the permission interface, accessing the data associated with the first user and performing the action in response to the user request.

The method can also include, upon receiving user input from the first user prohibiting the access to the data associated with the first user, providing an indication in the messaging application that the task is not performed. The method can further include upon receiving user input from the first user prohibiting access of the data associated with the first user, and providing a first indication for rendering in the messaging application. The method can also include providing a second indication for rendering in a second messaging application associated with at least one other user, the first and second indications indicating failure to serve the user request, wherein the first and second indications are different.

Some implementations can include a system comprising one or more processors coupled to a nontransitory computer readable medium having stored thereon instructions that, when executed by the one or more processors, cause the one or more processors to perform operations. The operations can include providing a messaging application, on a first computing device associated with a first user, to enable communication between the first user and at least one other user, and detecting, at the messaging application, a user request. The operations can also include programmatically determining that an action in response to the user request requires access to data associated with the first user, and causing a permission interface to be rendered in the messaging application on the first computing device, the permission interface enabling the first user to approve or prohibit the access to the data associated with the first user. The operations can further include, upon receiving user input from the first user indicating approval of the access to the data associated with the first user, accessing the data associated with the first user and performing the action in response to the user request.

The operations can also include, upon receiving user input from the first user prohibiting the access to the data associated with the first user, providing an indication in the messaging application that the task is not performed. In some implementations, the first user can include a human user and the at least one other user can include an assistive agent. In some implementations, the first user can include a human user and the at least one other user can include a second human user, different from the first user, associated with a second computing device. The permission interface can be rendered in the messaging application on the first computing device associated with the first user and the permission interface is not displayed on the second computing device associated with the second human user.

DETAILED DESCRIPTION

One or more implementations described herein relate to permission control and management for messaging application bots.

Figure 1:
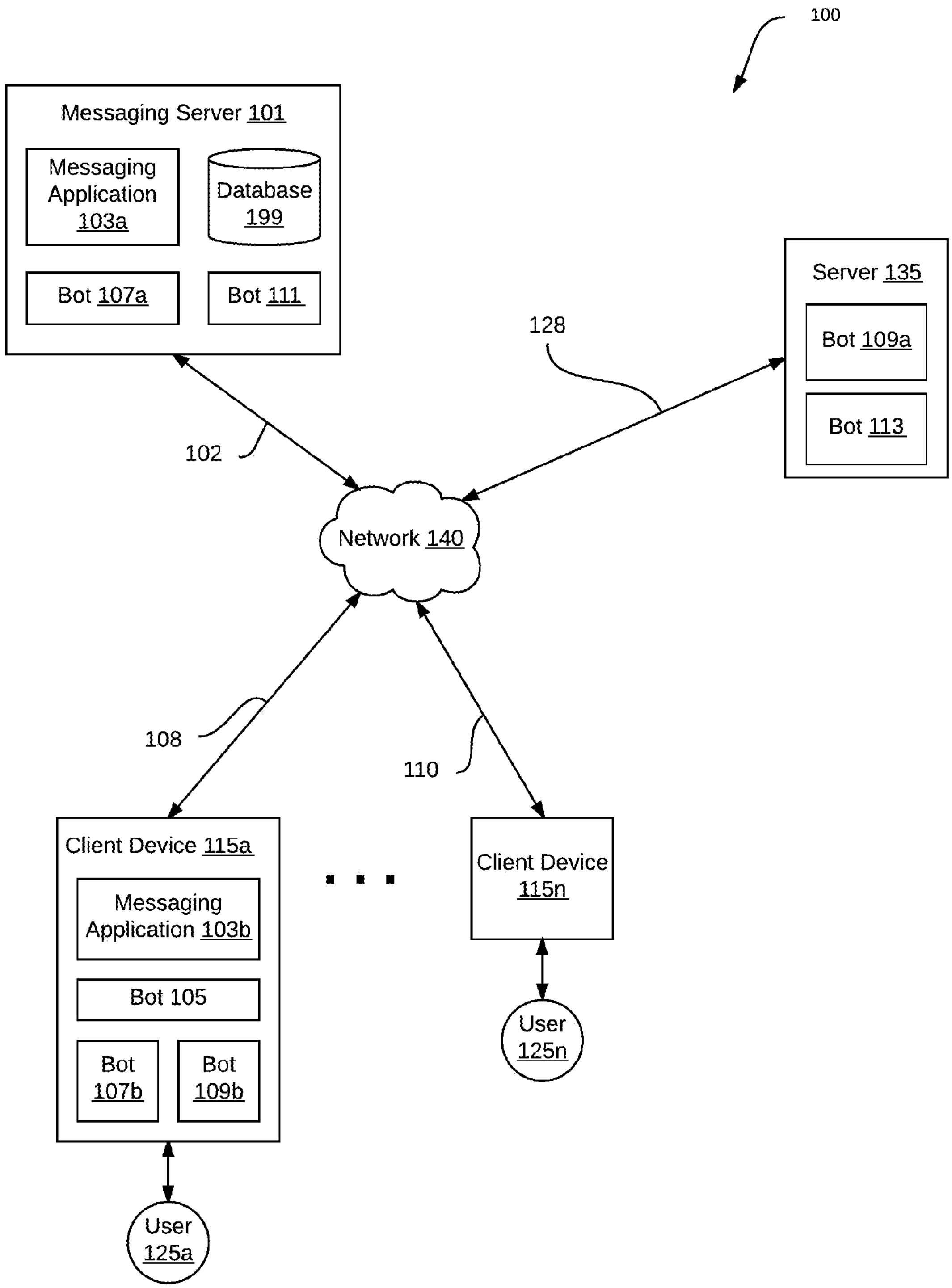
FIG. 1 shows a block diagram of an example environment in which messages may be exchanged between users and bots in accordance with some implementations.

FIG. 1 illustrates a block diagram of an example environment 100 for providing messaging services that enable and, in some embodiments, provide automatic assistive agents, e.g., bots. The exemplary environment 100 includes messaging server 101, one or more client devices 115*a*, 115*n*, server 135, and network 140. Users 125*a*-125*n* may be associated with respective client devices 115*a*, 115*n*. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to implementations of the element bearing that reference number.

In the illustrated implementation, messaging server 101, client devices 115, and server 135 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network. Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. Although FIG. 1 illustrates one network 140 coupled to client devices 115, messaging server 101, and server 135, in practice one or more networks 140 may be coupled to these entities.

Messaging server 101 may include a processor, a memory, and network communication capabilities. In some implementations, messaging server 101 is a hardware server. In some implementation, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115*a*-115*n*, server 135, and bot 113 via network 140. In some implementations, messaging server 101 may include messaging application 103*a* that provides client functionality to enable a user (e.g., any of users 125) to exchange messages with other users and/or with a bot. Messaging application 103*a* may be a server application, a server module of a client-server application, or a distributed application (e.g., with a corresponding client messaging application 103*b* on one or more client devices 115).

Messaging server 101 may also include database 199 which may store messages exchanged via messaging server 101, data and/or configuration of one or more bots, and user data associated with one or more users 125, all upon explicit permission from a respective user to store such data. In some embodiments, messaging server 101 may include one or more assistive agents, e.g., bots 107*a* and 111. In other embodiments, the assistive agents may be implemented on the client devices 115*a-n* and not on the messaging server 101.

Messaging application 103*a* may be code and routines operable by the processor to enable exchange of messages among users 125 and one or more bots 105, 107*a*, 107*b*, 109*a*, 109*b*, 111, and 113. In some implementations, messaging application 103*a* may be implemented using hardware including a field-programmable gate array (FPGA) or an application-specific integrated circuit (ASIC). In some implementations, messaging application 103*a* may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. In some implementations, messages are stored. In some implementations, database 199 may further store data and/or configuration of one or more bots, e.g., bot 107*a*, bot 111, etc. In some implementations when a user 125 provides consent for storage of user data (such as social network data, contact information, images, etc.) database 199 may also store user data associated with the respective user 125 that provided such consent.

In some implementations, messaging application 103*a*/103*b* may provide a user interface that enables a user 125 to create new bots. In these implementations, messaging application 103*a*/103*b* may include functionality that enables user-created bots to be included in conversations between users of messaging application 103*a*/103*b*.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115*a* is coupled to the network 140 via signal line 108 and client device 115*n* is coupled to the network 140 via signal line 110. Signal lines 108 and 110 may be wired connections, e.g., Ethernet, or wireless connections, such as Wi-Fi, Bluetooth, or other wireless technology. Client devices 115*a*, 115*n* are accessed by users 125*a*, 125*n*, respectively. The client devices 115*a*, 115*n* in FIG. 1 are used by way of example. While FIG. 1 illustrates two client devices, 115*a* and 115*n*, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 can be a smartwatch. In various implementations, user 125 may view messages from the messaging application 103*a*/103*b* on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103*b* is stored on a client device 115*a*. In some implementations, messaging application 103*b* (e.g., a thin-client application, a client module, etc.) may be a client application stored on client device 115*a* with a corresponding a messaging application 103*a* (e.g., a server application, a server module, etc.) that is stored on messaging server 101. For example, messaging application 103*b* may transmit messages created by user 125*a* on client device 115*a* to messaging application 103*a* stored on messaging server 101.

In some implementations, messaging application 103*a* may be a standalone application stored on messaging server 101. A user 125*a* may access the messaging application 103*a* via a web page using a browser or other software on client device 115*a*. In some implementations, messaging application 103*b* that is implemented on the client device 115*a* may include the same or similar modules as those included on messaging server 101. In some implementations, messaging application 103*b* may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107*a* and bot 111.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109*a* and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103*a*/103*b*. In some implementations, server 135 provides or hosts bots.

A bot is an automated service, implemented on one or more computers, that users interact with primarily through text, e.g., via messaging application 103*a*/103*b*. A bot may be implemented by a bot provider such that the bot can interact with users of various messaging applications. In some implementations, a provider of messaging application 103*a*/103*b* may also provide one or more bots. In some implementations, bots provided by the provider of messaging application 103*a*/103*b* may be configured such that the bots can be included in other messaging applications, e.g., provided by other providers. A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning, compared with that required to use a website, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125*a-n*) via messaging application 103*a*/103*b* to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103*a*/103*b* may provide many advantages. Conventionally, a user may utilize a software application or a website to perform activities such as paying bills, ordering food, booking tickets, etc. A problem with such implementations is that a user is required to install or use multiple software applications, and websites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a website that is hosted on one or more web servers, a customer support email hosted on an email server, etc. Another technical effect of described features is a reduction in the problem of consumption of system processing and transmission resources required for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107*a*/107*b*, 109*a*/109*b*, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103*a*/103*b* in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a messaging conversation without being specifically invoked. That is, the users may not need to specifically invoke the bot. In these embodiments, the bot may depend on analysis and understanding of the conversation on a continual basis or at discrete points of time. The analysis of the conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, the conversation may be analyzed on a continual basis or at discrete points of time, and the analysis of the conversation may be used to understand specific user needs and to identify when a bot should be suggested within the conversation.

In the embodiments in which a bot may automatically suggest information or actions within a messaging conversation without being specifically invoked, such functionality is disabled, e.g., if one or more users participating in the messaging conversation do not provide consent to a bot performing analysis of the users' conversation. Further, such functionality may also be disabled temporarily based on user input. For example, when the users indicate that a conversation is private or sensitive, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, as shown in FIG. 1, bot 105 is implemented on client device 115*a*. In this example, the bot may be a module in a software application that is local to client device 115*a*. For example, if a user has installed a taxi hailing application on client device 115*a*, bot functionality may be incorporated as a module in the taxi hailing application. In this example, a user may invoke a taxi bot, e.g., by sending a message "@taxibot get me a cab." Messaging application 103*b* may automatically cause the bot module in the taxi hailing application be launched. In this manner, a bot may be implemented locally on a client device such that the user can engage in conversation with the bot via messaging application 103.

In another example shown in FIG. 1, bot 107*a* is shown implemented on client device 115*a* and bot 107*b* is shown as implemented on messaging server 101. In this example, the bot may be implemented, e.g., as a client-server computer program, with portions of the bot functionality provided by each of bot 107*a* (server module) and bot 107*b* (client module). For example, if the bot is a scheduling bot with the handle @calendar, user 115*a* may schedule a reminder, by typing "@calendar remind me to pick up laundry in the evening," which may be handled by bot 107*b* (client module). Continuing with this example, if user 115*a* tells the bot "check if Jim is free to meet at 4," bot 107*a* (server module) may contact user Jim (or Jim's scheduling bot) to exchange messages, and provide a response to user 115*a*.

In another example, bot 109*a* (server module) is implemented on server 135 and bot 109*b* (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103*a*/103*b*, messaging application 103*a*/103*b* may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103*a*/103*b* are not implemented (e.g., disabled, removed, etc.). If the user provides consent, a bot or messaging application 103*a*/103*b* may make limited use of messages exchanged between users via messaging application 103*a*/103*b* to provide specific functionality, e.g., translation, scheduling, etc.

In some implementations, third parties distinct from a provider of messaging application 103*a*/103*b* and users 125, may provide bots that can communicate with users 125 via messaging application 103*a*/103*b* for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103*a*/103*b* may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103*a*/103*b* and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1234?" etc.

In some implementations, messaging application 103*a*/103*b* may also provide one or more suggestions, e.g., suggested responses, to users 125 via a user interface, e.g., as a button, or other user interface element. Suggested responses may enable faster interaction, e.g., by reducing or eliminating the need for a user to type a response. Suggested responses may enable users to respond to a message quickly and easily, e.g., when a client device lacks text input functionality (e.g., a smartwatch that does not include a keyboard or microphone). Suggested responses may also enable users to respond quickly to messages, e.g., when the user selects suggested response (e.g., by selecting a corresponding a user interface element on a touchscreen). Suggested responses may be generated using predictive models, e.g., machine learning models, that are trained to generate responses.

For example, messaging application 103*a*/103*b* may implement machine learning, e.g., a deep learning model, that can enhance user interaction with messaging application 103. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages and responses that were sent to the received messages. Based on the sample data, the machine-learning model can predict responses to received messages, which may then be provided as suggested responses. User interaction is enhanced, e.g., by reducing burden on the user to compose a response to a received message, by providing a choice of responses that are customized based on the received message and the user's context. For example, when users provide consent, suggested responses may be customized based on the user's prior activity, e.g., earlier messages in a conversation, messages in different conversations, etc. For example, such activity may be used to determine an appropriate suggested response for the user, e.g., a playful response, a formal response, etc. based on the user's interaction style. In another example, when the user specifies one or more preferred languages and/or locales, messaging application 103*a*/103*b* may generate suggested responses in the user's preferred language. In various examples, suggested responses may be text responses, images, multimedia, etc.

In some implementations, machine learning may be implemented on messaging server 101, on client devices 115, or on both messaging server 101 and client devices 115.

In some implementations, a simple machine learning model may be implemented on client device 115 (e.g., to permit operation of the model within memory, storage, and processing constraints of client devices) and a complex machine learning model may be implemented on messaging server 101. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, server 135, or other client devices 115.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a conversation provide consent to use of conversation data, suggestions may include suggested responses to incoming messages that are based on conversation content. For example, if a first user of two users that have consented to suggestions based on conversation content, sends a message "do you want to grab a bite? How about Italian?" a response may be suggested to the second user, e.g. "@assistant lunch, Italian, table for 2". In this example, the suggested response includes a bot (identified by the symbol @ and bot handle assistant). If the second user selects this response, the assistant bot is added to the conversation and the message is sent to the bot. A response from the bot may then be displayed in the conversation, and either of the two users may send further messages to the bot. In this example, the assistant bot is not provided access to the content of the conversation, and suggested responses are generated by the messaging application 103.

In certain implementations, the content of a suggested response may be customized based on whether a bot is already present in a conversation or is able to be incorporated into the conversation. For example, if it is determined that a travel bot could be incorporated into the messaging app, a suggested response to a question about the cost of plane tickets to France could be "Let's ask travel bot!"

In different implementations, suggestions, e.g., suggested responses, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), etc. In some implementations, suggested responses may be formatted and/or styled, e.g., using colors, fonts, layout, etc. For example, a suggested response that includes a movie recommendation may include descriptive text about the movie, an image from the movie, and a link to buy tickets. In different implementations, suggested responses may be presented as different types of user interface elements, e.g., text boxes, information cards, etc.

In different implementations, users are offered control over whether they receive suggestions, what types of suggestions they receive, a frequency of the suggestions, etc. For example, users may decline to receive suggestions altogether, or may choose specific types of suggestions, or to receive suggestions only during certain times of day. In another example, users may choose to receive personalized suggestions. In this example, machine learning may be used to provide suggestions, based on the user's preferences relating to use of their data and use of machine learning techniques.

Figure 2:
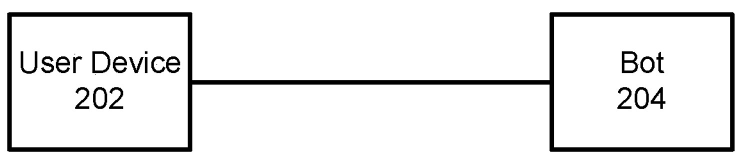
FIG. 2 is a diagram of an example arrangement of user device and bot communication in accordance with some implementations.

FIG. 2 is a diagram of an example arrangement of one user device and one bot or assistive agent in communication in accordance with some implementations. In the example arrangement shown in FIG. 2, the user device 202 (e.g., 115*a*-115*n* from FIG. 1) is in a one-to-one conversation with a bot 204 (e.g., 105, 107*a*, 107*b*, 109*a*, 109*b*, 111, and/or 113). A user associated with the user device 202 (e.g., user 125*a*-125*n*) may invoke the bot 204 and engage in a communication session with the bot 204. Alternatively, the bot 204 may automatically initiate communication with the user associated with the user device 202. It will be appreciated that "user" as described in the examples refers to a human user. However, it will also be appreciated that a user can include a computer or other non-human system and that communications between a user and a bot can include communications between a human user and a bot, between a non-human such as a computer (e.g., software application executing on a computer, etc.) and a bot, and/or between one or more bots and one or more other bots.

Figure 3:
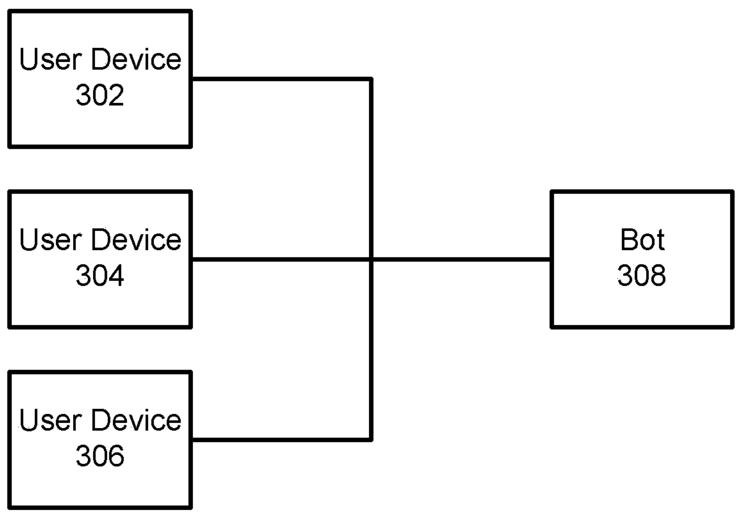
FIG. 3 is a diagram of an example arrangement of user device and bot communication in accordance with some implementations.

FIG. 3 is a diagram of an example arrangement of two or more user devices and a single bot or assistive agent in communication in accordance with some implementations. In the example arrangement show in FIG. 3, user devices 302-306 (e.g., 115*a*-115*n* from FIG. 1) may be in a group messaging conversation that includes a bot 308 (e.g., 105, 107*a*, 107*b*, 109*a*, 109*b*, 111, and/or 113). One or more of the users associated with the user devices 302-306 (e.g., one or more of users 125*a*-125*n*) may interact with the bot 308 and engage in a communication session with the bot 308. Some or all of the communications from the bot may be placed into the group messaging conversation. Also, some information provided to and from the bot 308 may only be available, e.g., displayed, to the user associated with that information. The bot 308 may automatically initiate communications with one or more of the users associated with the user devices 302-306.

Figure 4:
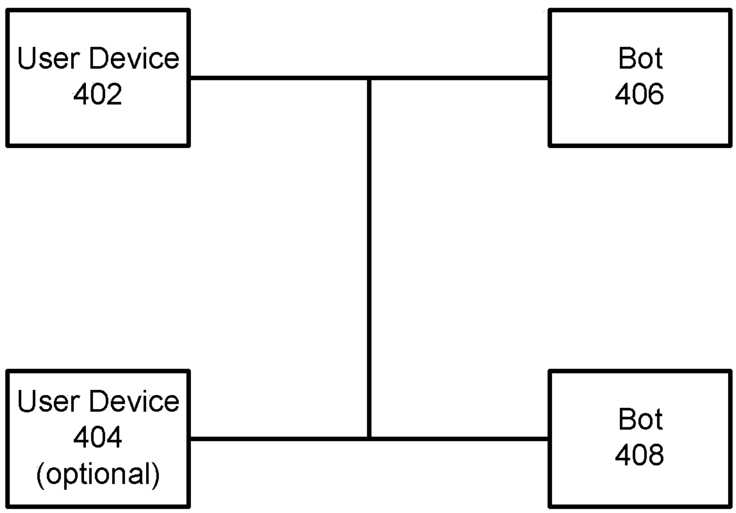
FIG. 4 is a diagram of an example arrangement of user device and bot communication in accordance with some implementations.

FIG. 4 is a diagram of an example arrangement of two or more user devices and two or more bots or assistive agents in communication in accordance with some implementations. In the example arrangement show in FIG. 4, user devices 402 and optionally 404 (e.g., 115*a*-115*n* from FIG. 1) may be in a group messaging conversation that includes a plurality of bots 406-408 (e.g., 105, 107*a*, 107*b*, 109*a*, 109*b*, 111, and/or 113 of FIG. 1). One or more of the users associated with the user devices 402-404 (e.g., one or more of users 125*a*-125*n*) may interact with one or both of the bots 406-408 and engage in a communication session with the bots 406-408. Some or all of the communications from the bots may be placed into the group messaging conversation. Also, some information provided to and from the bots 406-408 may only be available, e.g., displayed, to the user associated with that information. The bots 406-408 may automatically initiate communications with one or more of the users associated with the user devices 402-404.

Figure 5:
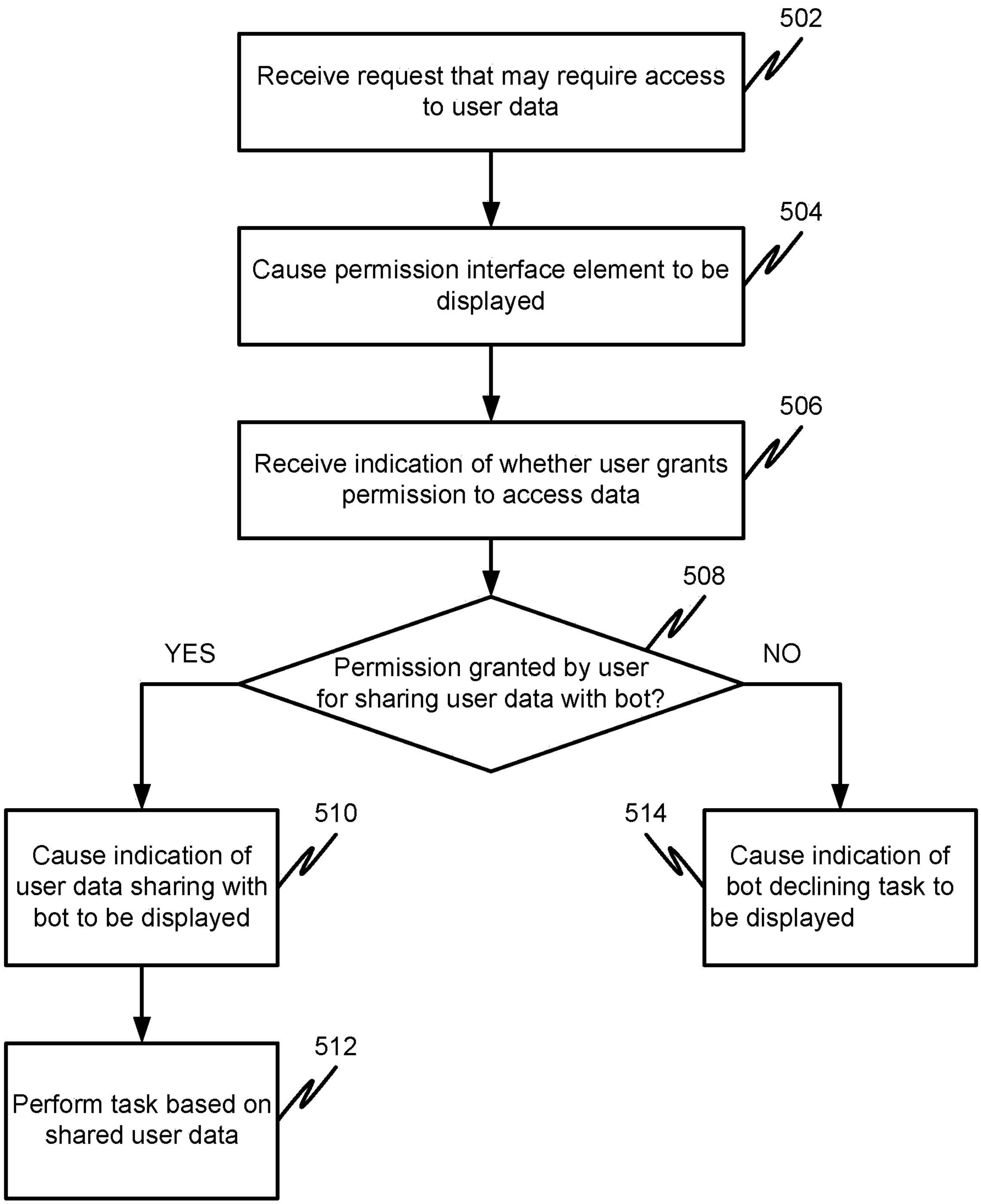
FIG. 5 is a flow diagram of an example method to manage bot permissions in accordance with some implementations.

FIG. 5 is a flow diagram of an example method to manage bot permissions in accordance with some implementations. Processing begins at 502, where a request from a user is received at a bot. The request may include a requested task for the bot to perform. In some implementations, the request may be a command for the bot. For example, a request that includes a command for a reservation bot may be "@reservationbot find a hotel nearby," a request that includes a command for an assistant bot may be "@assistant send my flight details to Jim," etc. In this example, the bot is identified by a bot handle, e.g., the "@" symbol followed by a name of the bot (e.g., reservationbot, assistant, etc.) In order to perform the task and/or provide a response to the request, the bot may require access to user data. The user and the bot may be in a one-to-one communication arrangement (e.g., FIG. 2). For example, a user may request a car service pick up and the car service bot may need to know the user's location in order to determine which cars may be available for picking up the user. In another example, a user may wish to make a hotel reservation at a nearby hotel and the hotel reservation bot may need to know the user's location. In yet another example, a bot may provide suggested responses for a user that include sharing user information (e.g., photos, calendar entries, flight schedules, etc.) and the suggestion bot may need to obtain the user's permission to access data that may be helpful for a suggested response and to provide such data as an actual response. The request may be a request from a user or may be an automatically generated request (e.g., from a suggested response bot, etc.). Processing continues to 504.

Figure 6:
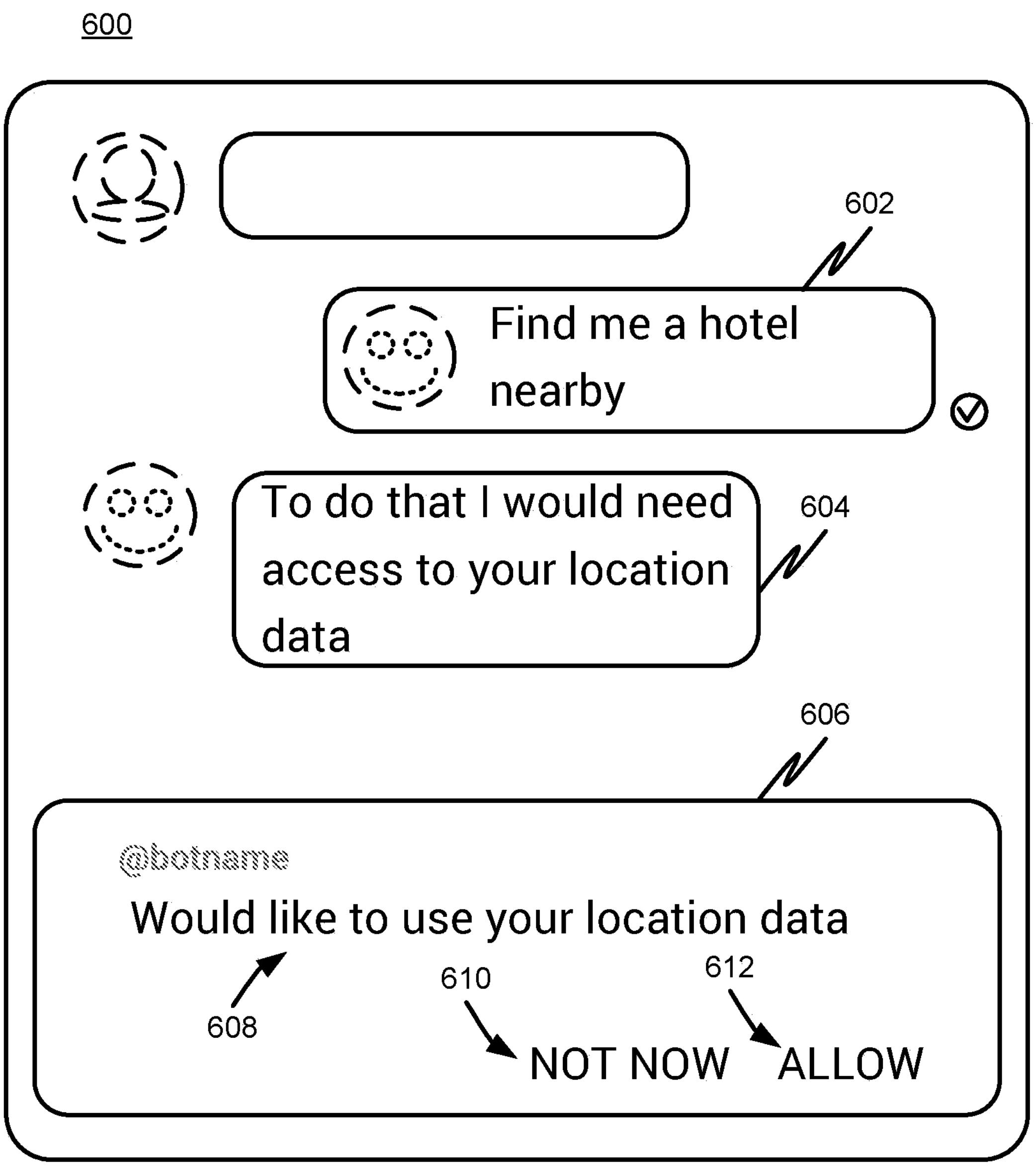
FIG. 6 is a diagram of an example user interface with bot messaging in accordance with some implementations.

At 504, a permission user interface element is caused to be displayed to the user associated with the request. An example of a permission request user interface element is shown in FIG. 6 and described below. The permission user interface element may also be presented as an audio prompt or using other user interface and/or output methods. Processing continues to 506. At 506, an indication is received of whether the user grants the bot permission to access or obtain the user data. The indication can be received in the form of a user interface element selection (e.g., touching, tapping, selecting an on screen user interface button, via typing, audio input, gesture input, etc.) that indicates whether the user grants permission or not. For example, the user could select one of "NOT NOW" or "ALLOW" options shown in the permission user interface element of FIG. 6. Processing continues to 508.

At 508, the bot permission system determines whether permission was granted or not. Determining whether permission was granted can be accomplished by evaluating the indication received in step 506. If permission was granted, processing continues to 510. If permission was not granted, processing continues to 514.

At 510, an indication of user data being shared with the bot optionally can be provided. For example, the indication "Sharing location data" shown in FIG. 7 can be provided as an indication that user data was shared with the bot according to the permission granted by the user. Processing continues to 512. At 512, the bot may perform further processing to complete the task associated with the permissions that were granted. For example, a car service bot can continue to determine which cars may be in a location to provide car service to the user. In another example, a lodging bot can use shared user location to determine nearby accommodations that are vacant and available for rental.

At 514, the bot can cause an indication of declining the task to be displayed to the user. For example, the bot could provide an indication such as "Sorry I didn't get your location—I'm unable to schedule a car" or the like. The indication could be displayed on a graphical user interface and/or provided in the form of an audio cue or other output indication.

FIG. 6 is a diagram of an example user interface 600 with bot messaging in accordance with some implementations. In particular, the user interface 600 includes a message (602) from a user to a bot. Message 602 includes a request ("Find me a hotel nearby") that may require use of the user's personal information, e.g., location information (e.g., finding a nearby hotel). In response to the request from the user, the bot may send a message (604) to the user indicating that the bot needs access to the user's location data to complete the request.

The bot can cause to be displayed a permission allow/disallow interface element 606. The permission element 606 can include a description (608) of what type of permission is needed and input elements for not allowing or allowing the bot permission to access (or receive) user data, 610 and 612 respectively.

Figure 7:
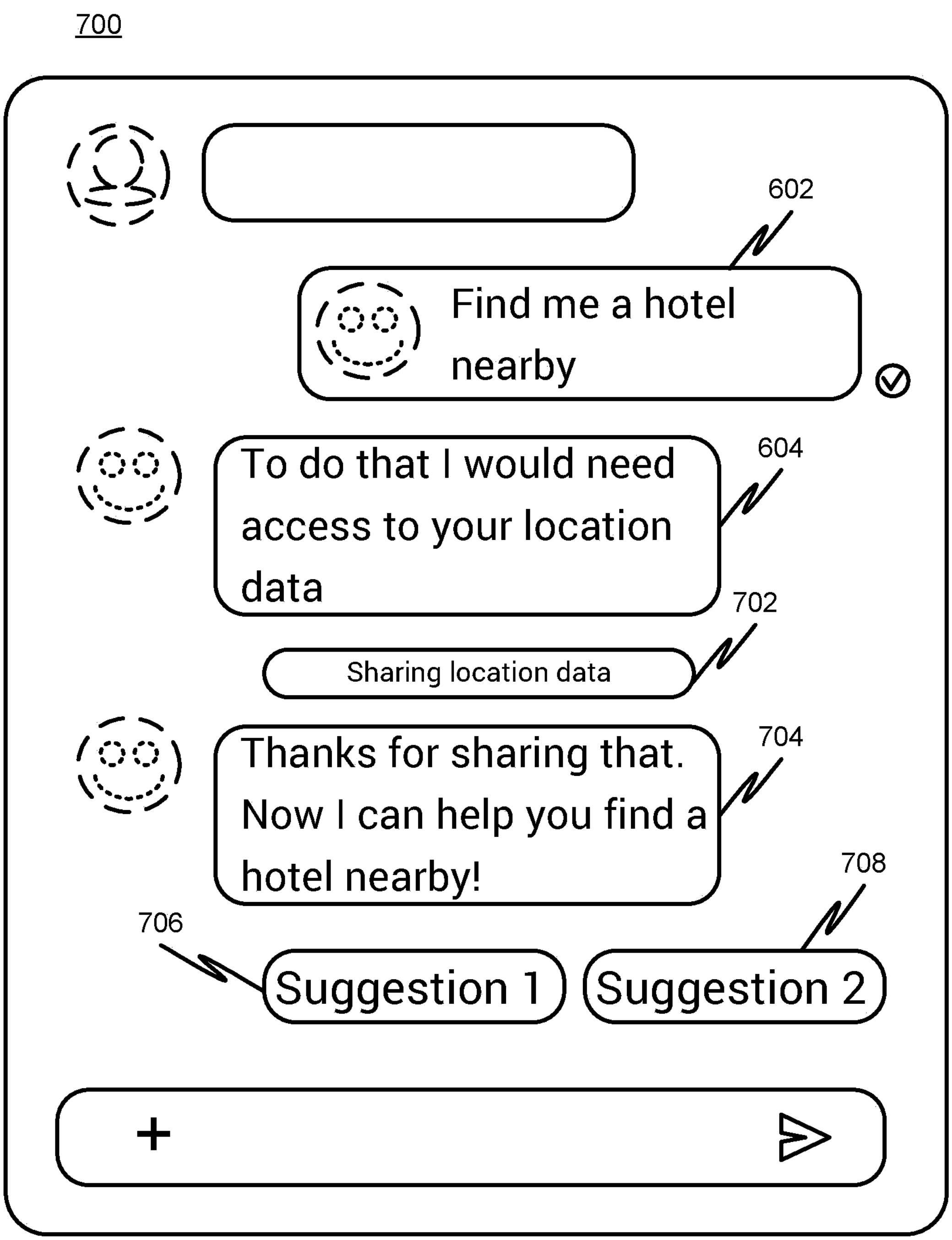
FIG. 7 is a diagram of an example user interface with bot messaging in accordance with some implementations.

FIG. 7 is a diagram of an example user interface 700 which follows from FIG. 6 and in which the user has granted the bot permission to use the user's location data. The user interface 700 includes elements 602-604 described above in connection with FIG. 6. The user interface 700 also includes an indication (702) that user data was shared with the bot in response to user granting the permission, e.g., by selecting input element 612. The user interface 700 also includes a message (704) from the bot that indicates that the bot is working on the request, and one or more optional suggestions from the bot (706 and 708). If a user selects one of the suggestion elements (706, 708), the bot can cause to be displayed details about the suggestion from the bot, in this example details about suggested nearby hotels identified by the bot.

Figure 8:
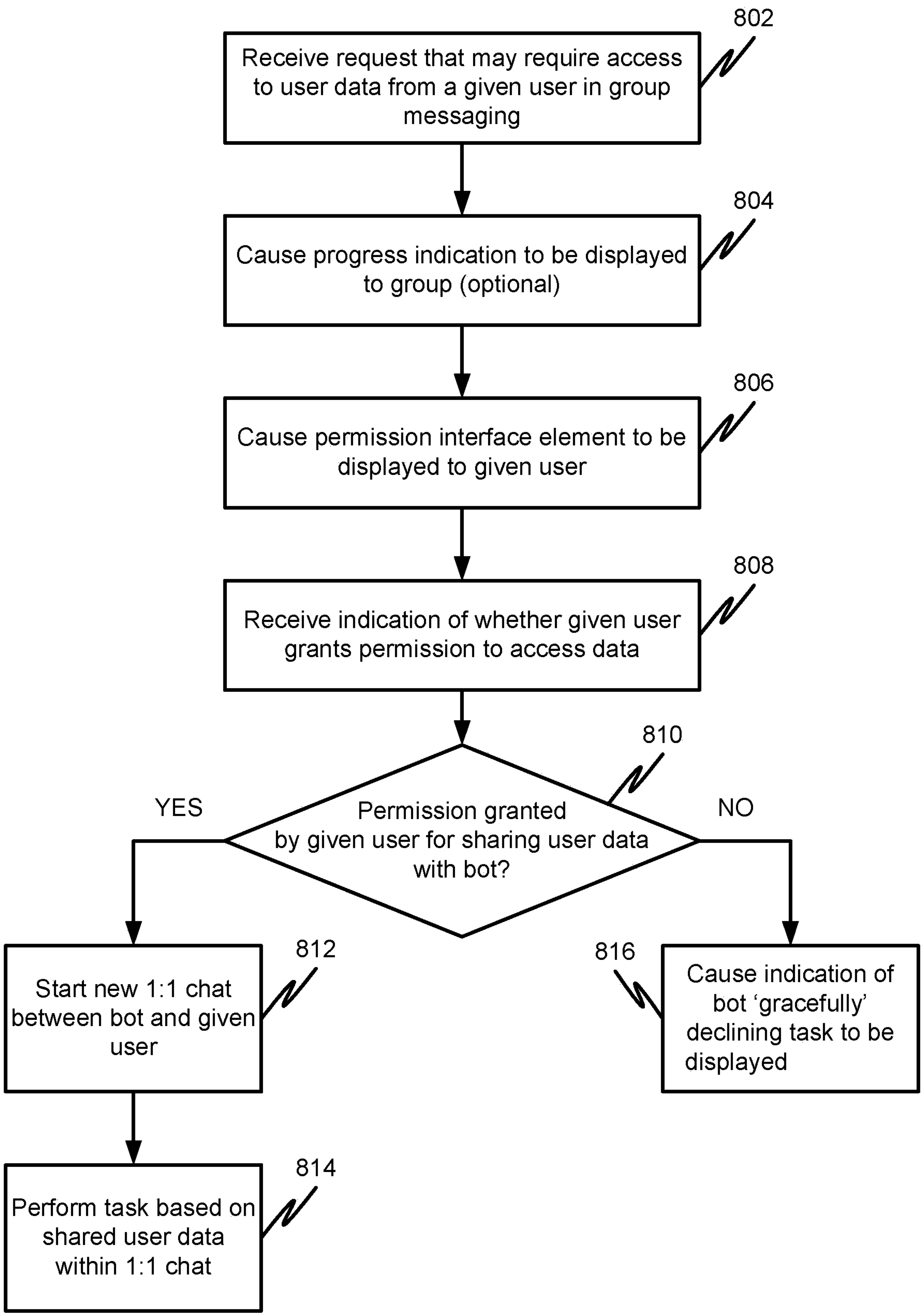
FIG. 8 is a flow diagram of an example method to manage bot permissions in accordance with some implementations.

FIG. 8 is a flow diagram of an example method to manage bot permissions within a group messaging context (e.g., within a "group chat") in accordance with some implementations. Processing begins at 802, where a request from a user is received at a bot. In order to perform a requested task and/or provide a response to the request, the bot may require access to user data. The user and the bot may be in a group communication arrangement (e.g., as illustrated in FIG. 3 or FIG. 4) with multiple users and/or bot. For example, in a communication session with multiple users, a user may request a car service pick up, e.g., for the multiple users. The car service bot may need to know the location of each user that is to be included in the pickup in order to determine which cars may be available for picking up the users. In another example, a user may wish to make a hotel reservation at a nearby hotel for the group of users participating in the conversation. In this example, the hotel reservation bot may need to know information about the group of users, e.g., names, payment information, etc. The request may be a request from a user or may be an automatically generated request (e.g., from a suggested response bot, etc.). Processing continues to 804.

At 804, a progress indication is optionally displayed by the bot and may be visible in the group conversation to the group or to the individual user making the request. For example, a car service bot may display a message such as "I'm working on it" in the group conversation. Processing continues to 806.

At 806, a permission user interface element is caused to be displayed to the user associated with the request. An example of a permission request user interface element is shown in FIG. 6 and described above. The permission user interface element may also be presented as an audio prompt or using other user interface and/or output methods. Processing continues to 808.

At 808, an indication is received of whether one or more users grant the bot permission to access or obtain respective user data. The indication can be received in the form of a user interface element selection (e.g., touching, tapping, selecting an on screen user interface button, via typing, audio input, gesture input, etc.) that indicates whether the user grants permission or not. For example, the user could select one of "NOT NOW" or "ALLOW" shown in the permission user interface element of FIG. 6. Processing continues to 810.

At 810, the bot permission system determines whether permission was granted or not. Determining whether permission was granted can be accomplished by evaluating the indication received in step 808. If permission was granted, processing continues to 812. If permission was not granted, processing continues to 816.

At 812, the bot can start a one-to-one chat with the user. The one-to-one chat and the messages exchanged in the one-to-one chat are not visible to the group of users in the group messaging conversation. Processing continues to 814.

At 814, the bot may perform further processing to complete the task associated with the permissions that were granted within the one-to-one user messaging conversation. For example, a car service bot could continue to determine which cars may be in a location to provide car service to the user. In another example, a lodging bot could use shared user location to determine nearby accommodations that are vacant and available for rental.

At 816, the bot can cause a "graceful" indication of declining the task to be displayed to the user within the group messaging conversation. For example, the bot could provide an indication such as "I wasn't able to get your location—I'm unable to schedule a car" or the like. The indication could be displayed on a graphical user interface or provided in the form of an audio cue or other output indication. The graceful aspect of the decline message can include a message that does not explicitly indicate that a user did not grant the bot permission to use the user's data. In different implementations, the indication may include different textual content, e.g., based on the request, or other factors. For example, an indication in response to user prohibiting access to location in the context of ordering a car may include textual content such as "Sorry, unable to get location," "I'm unable to find cars near you," "Car service not available," etc. In some implementations, different indications may be sent to different participants in a group conversation. In some implementations, indications may use different formats, e.g., text box, graphical indication, animated indication, etc. In some implementations, the indications may use different styles, e.g., boldface text, italicized text, fonts, colors, etc.

Figure 9:
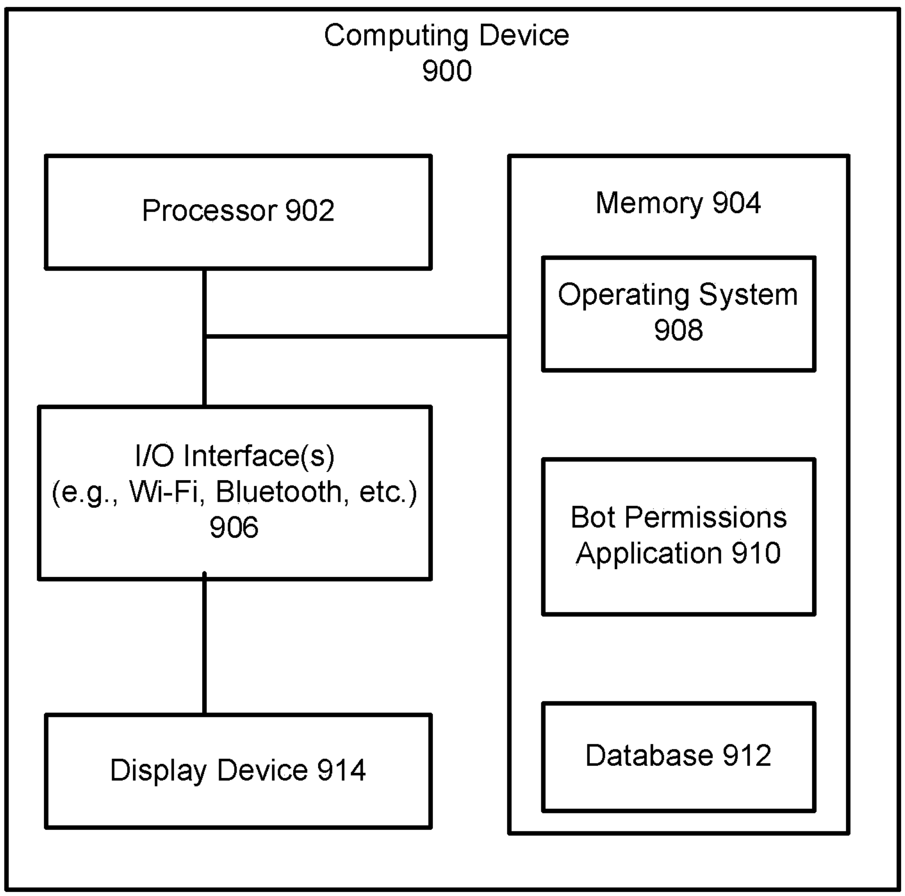
FIG. 9 is a diagram of an example computing device configured to manage bot permissions in accordance with some implementations.

FIG. 9 is a block diagram of an example computing device 900 which may be used to implement one or more features described herein. In one example, computing device 900 may be used to implement a client (or user) device, e.g., any of client devices 115*a*-115*n* shown in FIG. 1. Computing device 900 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, computing device 900 includes a processor 902, a memory 904, and input/output (I/O) interface 906. Processor 902 can be one or more processors and/or processing circuits to execute program code and control basic operations of the computing device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in computing device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the computing device 900 by the processor 902, including an operating system 908 and one or more applications 910 such as a messaging application, a bot application, etc. In some implementations, the applications 910 can include instructions that enable processor 902 to perform functions described herein, e.g., one or more of the methods of FIGS. 5 and/or 8. For example, applications 910 can include messaging and/or bot applications, including a program to manage bot permissions as described herein. One or more of the applications can, for example, provide a displayed user interface responsive to user input to display selectable options or controls, and data based on selected options. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 904 can alternatively be stored on any other suitable storage location or computer-readable medium. In addition, memory 904 (and/or other connected storage device(s)) can store messages, permission settings, user preferences and related data structures, parameters, audio data, user preferences, and/or other instructions and data used in the features described herein in a database 912. Memory 904 and any other type of storage (magnetic disk, optical disk, magnetic tape, or other tangible media) can be considered "storage" or "storage devices."

The I/O interface 906 can provide functions to enable interfacing the computing device 900 with other systems and devices. Interfaced devices can be included as part of the computing device 900 or can be separate and communicate with the computing device 900. For example, network communication devices, wireless communication devices, storage devices, and input/output devices can communicate via the I/O interface 906. In some implementations, the I/O interface 906 can connect to interface devices such as input devices (keyboard, pointing device, touch screen, microphone, camera, scanner, sensors, etc.) and/or output devices (display device, speaker devices, printer, motor, etc.).

Some examples of interfaced devices that can connect to I/O interface 906 can include a display device 914 that can be used to display content, e.g., images, video, and/or a user interface of an output application as described herein. Display device 914 can be connected to computing device 900 via local connections (e.g., display bus) and/or via networked connections and can be any suitable display device. The display device 914 can include any suitable display device such as a liquid crystal display (LCD), light emitting diode (LED), or plasma display screen, cathode ray tube (CRT), television, monitor, touch screen, 3-D display screen, or other visual display device. For example display device 914 can be a flat display screen provided on a mobile device, multiple display screens provided in a goggles device, or a monitor screen for a computer device.

The I/O interface 906 can interface to other input and output devices. Some examples include one or more cameras, which can capture image frames. Orientation sensors, e.g., gyroscopes and/or accelerometers, can provide sensor data indicating device orientation (which can correspond to view orientation in some implementations) and/or camera orientation. Some implementations can provide a microphone for capturing sound (e.g., voice commands, etc.), audio speaker devices for outputting sound, or other input and output devices.

For ease of illustration, FIG. 9 shows one block for the processor 902, the memory 904, the I/O interface 906, the operating system 908, and the bot permissions application 910, respectively. These blocks may represent one or more processors or processing circuitries, operating systems, memories, I/O interfaces, applications, and/or software modules. In other implementations, computing device 900 may not have all of the components shown and/or may have other elements including other types of elements instead of, or in addition to, those shown herein. While user devices (e.g., 115*a*-115*n*) are described as performing blocks and operations as described in some implementations herein, any suitable component or combination of components of user devices (e.g., 115*a*-115*n*) or similar devices, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device (CPLD), etc.), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user's phone number or partial phone number, user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time. Further implementations are disclosed below.

What is claimed is:

1. A computer-implemented method comprising:

receiving, by a bot deployed within a messaging application, a prediction from a suggestion machine-learning model;

generating, by the bot, a suggestion to perform a specific action, the generation of the suggestion to perform the specific action based on the prediction from the suggestion machine-learning model;

receiving, by the bot, a request of a user to perform the specific action;

programmatically determining, by the bot, that the specific action requires access to user data associated with the user;

causing, by the bot, a permission interface to be rendered, the permission interface enabling the user to approve access to user data associated with the user;

receiving, by the bot, a user input indicating approval of the access to the user data associated with the user;

responsive to receiving the user input indicating approval of the access to the user data associated with the user, accessing, by the bot, the user data associated with the user;

and responsive to accessing the user data associated with the user, performing the specific action.

2. The computer-implemented method of claim 1, wherein:

the user is a first user;

the specific action is related to a second user; and the method further comprises:

obtaining, by the bot, permission from the second user to receive one or more messages from the bot; and sending, by the bot, the one or more messages to the second user to obtain information associated with the specific action, wherein performing the specific action occurs responsive to receiving, by the bot, the information associated with the specific action from the second user.

3. The computer-implemented method of claim 1, wherein the user is a first user, the method further comprising:

obtaining, by the bot, permission from a second user to approve access to user data associated with the second user; and analyzing, by the bot, one or more messages between the first user and the second user, wherein the suggestion to perform the specific action is determined based on analyzing the one or more messages.

4. The computer-implemented method of claim 1, wherein the user is a first user, the method further comprising:

obtaining, by the bot, permission from a second user to approve access to user data associated with the second user;

receiving, by the bot, an indication from the first user that a conversation between the first user and the second user is confidential; and abstaining from analysis, by the bot, of the conversation until the first user or the second user reactivates the bot.

5. The computer-implemented method of claim 1, wherein the programmatically determining that the specific action requires access to the user data associated with the user is performed by a second machine-learning model, the second machine-learning model taking as an input at least the request of the user for the messaging application to perform the specific action.

6. The computer-implemented method of claim 1, wherein:

the suggestion machine-learning model takes as an input at least a content from a device associated with the user;

the content is based on a context of the user; and the context of the user comprises at least one of information on interactions of the user with one or more other users, one or more external conditions, one or more schedules of the user, or an activity of the user.

7. The computer-implemented method of claim 1, further comprising performing, by the bot, the specific action in a particular style.

8. The computer-implemented method of claim 7, wherein the particular style comprises one of a formal style, a playful style, a neutral style, or an emoji style.

9. The computer-implemented method of claim 1, wherein the messaging application is accessed on a user device, and:

the accessing of the messaging application comprises a virtual implementation of the messaging application; and the messaging application is implemented on a connected device, the connected device communicatively coupled to the user device.

10. The computer-implemented method of claim 1, further comprising, responsive to receiving the user input indicating approval of the access to the user data associated with the user, storing the user data in:

a memory of a user device, wherein the messaging application is accessed on the user device; or a memory of a connected device, wherein the connected device is communicatively coupled to the user device.

11. The computer-implemented method of claim 1, wherein the messaging application is accessed on a user device, wherein the user device is one of:

a camera;

a laptop computer;

a tablet computer;

a mobile telephone;

a wearable device;

a mobile email device;

a portable game player;

a portable music player;

a reader device;

a head-mounted display;

a smartwatch;

a smart wristband;

headphones; or a first electronic device and a second electronic device, the first electronic device comprising a memory and communicatively coupled to the second electronic device, the second electronic device configured to receive the user input.

12. The computer-implemented method of claim 1, wherein the bot is in communication with one or more other messaging applications, the one or more other messaging applications different from the messaging application.

13. The computer-implemented method of claim 1, wherein the specific action is an action of a second bot, the second bot different from the bot.

14. The computer-implemented method of claim 13, wherein the second bot is not accessed by the messaging application.

15. The computer-implemented method of claim 1, wherein the specific action is providing one or more of an information, a travel function, a request for a taxi service, a coaching, a tutoring, an implementation of a game, a commerce action, or an interfacing.

16. The computer-implemented method of claim 15, wherein the information is based on an internet search.

17. The computer-implemented method of claim 15, wherein the travel function comprises:

a purchase of a ticket; or a making of a reservation.

18. The computer-implemented method of claim 15, wherein the interfacing comprises:

accessing a remote device; and performing a remote action on the remote device, the remote action on the remote device comprising one or more of:

chatting with the remote device;

retrieving information from the remote device; or providing instructions to the remote device.

19. The computer-implemented method of claim 18, wherein the remote device is a vehicle.

20. The computer-implemented method of claim 1, further comprising determining, by the bot, an intent of the user, wherein the suggestion to perform the specific action is further based on the intent of the user.

21. The computer-implemented method of claim 20, wherein the determination of the intent of the user is based on a context of a conversation of the user.

22. The computer-implemented method of claim 1, further comprising receiving, by the messaging application, a command of the user to access a specific bot from among a plurality of available bots, wherein:

the bot comprises the specific bot from among the plurality of available bots; and the accessing of the bot is responsive to the command of the user.

23. The computer-implemented method of claim 22, wherein the command of the user to access the specific bot from among the plurality of available bots comprises one of a text input or a voice input.

24. The computer-implemented method of claim 1, wherein the request of the user to perform the specific action and the user input indicating approval of the access to the user data associated with the user are a same input from the user.

25. The computer-implemented method of claim 1, wherein the messaging application comprises a conversation between the user and at least one other person, the method further comprising suggesting, by the messaging application and in the conversation, an invocation of the bot.

26. The computer-implemented method of claim 1, wherein the user data is one or more of a location data, a payment information, or a contact information.

27. The computer-implemented method of claim 26, wherein:

the user data is the location data; and the specific action is based on a proximity to a location, the location based on the location data.

28. The computer-implemented method of claim 27, wherein the suggestion to perform the specific action comprises a recommendation for a service within the proximity.

29. The computer-implemented method of claim 1, wherein the prediction is based at least in part on a natural language processing.

30. The computer-implemented method of claim 1, wherein:

the messaging application is accessed on a first user device; and the suggestion to perform the specific action is a suggested response to a message in the messaging application, the message from a second user device.

31. The computer-implemented method of claim 1, wherein the specific action is a translation.

32. The computer-implemented method of claim 1, wherein the suggestion to perform the specific action comprises one or more of a text, an image, a link, an emoji, or a multimedia component.

33. The computer-implemented method of claim 1, wherein the performing of the specific action by the bot is performed by a module of a user device, wherein the messaging application is accessed on the user device.

34. The computer-implemented method of claim 33, wherein the bot is a first bot and the module is a second bot, the second bot:

implemented on the user device; or implemented on a connected device and accessed on the user device, wherein the connected device is communicatively coupled to the user device.

35. The computer-implemented method of claim 1, wherein:

the messaging application is implemented on a user device; and the bot is accessed on the user device and implemented on a connected device, the connected device communicatively coupled to the user device.

36. The computer-implemented method of claim 1, wherein:

the messaging application is implemented on a user device; and the bot is implemented on the user device.

37. The computer-implemented method of claim 1, wherein:

the messaging application is accessed on a user device and implemented on a connected device, the connected device communicatively coupled to the user device; and the bot is implemented on the user device.

38. The computer-implemented method of claim 1, wherein:

the messaging application is accessed on a user device and implemented on a connected device, the connected device communicatively coupled to the user device; and the bot is accessed on the user device and implemented on the connected device.

39. A non-transitory computer-readable medium with instructions stored thereon that, when executed by one or more processors, cause the one or more processors to perform operations, the operations comprising:

receiving, by a bot deployed within a messaging application, a prediction from a suggestion machine-learning model;

generating, by the bot, a suggestion to perform a specific action, the generation of the suggestion to perform the specific action based on the prediction from the suggestion machine-learning model;

receiving, by the bot, a request of a user to perform the specific action;

programmatically determining, by the bot, that the specific action requires access to user data associated with the user;

causing, by the bot, a permission interface to be rendered, the permission interface enabling the user to approve access to user data associated with the user;

receiving, by the bot, a user input indicating approval of the access to the user data associated with the first user;

responsive to receiving the user input indicating approval of the access to the user data associated with the user, accessing, by the bot, the user data associated with the user;

and responsive to accessing the user data associated with the user, performing the specific action.

40. The non-transitory computer-readable medium of claim 39, wherein:

the user is a first user;

the specific action is related to a second user; and the operations further comprise:

obtaining, by the bot, permission from the second user to receive one or more messages from the bot; and sending, by the bot, the one or more messages to the second user to obtain information associated with the specific action, wherein performing the specific action occurs responsive to receiving, by the bot, the information associated with the specific action from the second user.

41. The non-transitory computer-readable medium of claim 39, wherein the user is a first user and the operations further comprise:

obtaining, by the bot, permission from a second user to approve access to user data associated with the second user; and analyzing, by the bot, one or more messages between the first user and the second user, wherein the suggestion to perform the specific action is determined based on analyzing the one or more messages.

42. The non-transitory computer-readable medium of claim 39, wherein the user is a first user and the operations further comprise:

obtaining, by the bot, permission from a second user to approve access to user data associated with the second user;

receiving, by the bot, an indication from the first user that a conversation between the first user and the second user is confidential; and abstaining from analysis, by the bot, of the conversation until the first user or the second user reactivates the bot.

43. The non-transitory computer-readable medium of claim 39, wherein the programmatically determining that the specific action requires access to the user data associated with the user is performed by a second machine-learning model, the second machine-learning model taking as an input at least the request of the user for the messaging application to perform the specific action.

44. The non-transitory computer-readable medium of claim 39, wherein:

the suggestion machine-learning model takes as an input at least a content from a device associated with the user;

the content is based on a context of the user; and the context of the user comprises at least one of information on interactions of the user with one or more other users, one or more external conditions, one or more schedules of the user, or an activity of the user.

45. The non-transitory computer-readable medium of claim 39, wherein the operations further comprise performing, by the bot, the specific action in a particular style.

46. The non-transitory computer-readable medium of claim 45, wherein the particular style comprises one of a formal style, a playful style, a neutral style, or an emoji style.

47. The non-transitory computer-readable medium of claim 39, wherein the messaging application is accessed on a user device, and:

the accessing of the messaging application comprises a virtual implementation of the messaging application; and the messaging application is implemented on a connected device, the connected device communicatively coupled to the user device.

48. The non-transitory computer-readable medium of claim 39, wherein the operations further comprise, responsive to receiving the user input indicating approval of the access to the user data associated with the user, storing the user data:

in the non-transitory computer-readable medium, wherein the messaging application is accessed on a user device; or in a memory of a connected device, wherein the connected device is communicatively coupled to the user device.

49. The non-transitory computer-readable medium of claim 39, wherein the messaging application is accessed on a user device, wherein the user device is one of:

a camera;
a laptop computer;
a tablet computer;
a mobile telephone;
a wearable device;
a mobile email device;
a portable game player;
a portable music player;
a reader device;
a head-mounted display;
a smartwatch;
a smart wristband;
headphones; or
a first electronic device and a second electronic device, the first electronic device comprising a memory and communicatively coupled to the second electronic device, the second electronic device configured to receive the user input.

50. The non-transitory computer-readable medium of claim 39, wherein the bot is in communication with one or more other messaging applications, the one or more other messaging applications different from the messaging application.

51. The non-transitory computer-readable medium of claim 39, wherein the specific action is an action of a second bot, the second bot different from the bot.

52. The non-transitory computer-readable medium of claim 51, wherein the second bot is not accessed by the messaging application.

53. The non-transitory computer-readable medium of claim 39, wherein the specific action is providing one or more of an information, a travel function, a request for a taxi service, a coaching, a tutoring, an implementation of a game, a commerce action, or an interfacing.

54. The non-transitory computer-readable medium of claim 53, wherein the information is based on an internet search.

55. The non-transitory computer-readable medium of claim 53, wherein the travel function comprises:

a purchase of a ticket; or
a making of a reservation.

56. The non-transitory computer-readable medium of claim 53, wherein the interfacing comprises:

accessing a remote device; and performing a remote action on the remote device, the remote action on the remote device comprising one or more of:

chatting with the remote device;
retrieving information from the remote device; or
providing instructions to the remote device.

57. The non-transitory computer-readable medium of claim 56, wherein the remote device is a vehicle.

58. The non-transitory computer-readable medium of claim 39, wherein the operations further comprise determining, by the bot, an intent of the user, wherein the suggestion to perform the specific action is further based on the intent of the user.

59. The non-transitory computer-readable medium of claim 58, wherein the determination of the intent of the user is based on a context of a conversation of the user.

60. The non-transitory computer-readable medium of claim 39, wherein the operations further comprise receiving, by the messaging application, a command of the user to access a specific bot from among a plurality of available bots, wherein:

the bot comprises the specific bot from among the plurality of available bots; and the accessing of the bot is responsive to the command of the user.

61. The non-transitory computer-readable medium of claim 60, wherein the command of the user to access the specific bot from among the plurality of available bots comprises one of a text input or a voice input.

62. The non-transitory computer-readable medium of claim 39, wherein the request of the user to perform the specific action and the user input indicating approval of the access to the user data associated with the user are a same input from the user.

63. The non-transitory computer-readable medium of claim 39, wherein:

the messaging application comprises a conversation between the user and at least one other person; and the instructions further cause the one or more processors to suggest, by the messaging application and in the conversation, an invocation of the bot.

64. The non-transitory computer-readable medium of claim 39, wherein the user data is one or more of a location data, a payment information, or a contact information.

65. The non-transitory computer-readable medium of claim 64, wherein:

the user data is the location data; and the specific action is based on a proximity to a location, the location based on the location data.

66. The non-transitory computer-readable medium of claim 65, wherein the suggestion to perform the specific action comprises a recommendation for a service within the proximity.

67. The non-transitory computer-readable medium of claim 39, wherein the prediction is based at least in part on a natural language processing.

68. The non-transitory computer-readable medium of claim 39, wherein:

the messaging application is accessed on a first user device; and the suggestion to perform the specific action is a suggested response to a message in the messaging application, the message from a second user device.

69. The non-transitory computer-readable medium of claim 39, wherein the specific action is a translation.

70. The non-transitory computer-readable medium of claim 39, wherein the suggestion to perform the specific action comprises one or more of a text, an image, a link, an emoji, or a multimedia component.

71. The non-transitory computer-readable medium of claim 39, wherein the performing of the specific action by the bot is performed by a module of a user device, wherein the messaging application is accessed on the user device.

72. The non-transitory computer-readable medium of claim 71, wherein the bot is a first bot and the module is a second bot, the second bot:

implemented on the user device; or implemented on a connected device and accessed on the user device, wherein the connected device is communicatively coupled to the user device.

73. The non-transitory computer-readable medium of claim 39, wherein:

the messaging application is implemented on a user device; and the bot is accessed on the user device and implemented on a connected device, the connected device communicatively coupled to the user device.

74. The non-transitory computer-readable medium of claim 39, wherein:

the messaging application is implemented on a user device; and the bot is implemented on the user device.

75. The non-transitory computer-readable medium of claim 39, wherein:

the messaging application is accessed on a user device and implemented on a connected device, the connected device communicatively coupled to the user device; and the bot is implemented on the user device.

76. The non-transitory computer-readable medium of claim 39, wherein:

the messaging application is accessed on a user device and implemented on a connected device, the connected device communicatively coupled to the user device; and the bot is accessed on the user device and implemented on the connected device.

77. A system comprising:

one or more processors; and a memory coupled to the one or more processors that stores instructions that, when executed by the one or more processors, cause the one or more processors to perform operations comprising:

receiving, by a bot deployed within a messaging application, a prediction from a suggestion machine-learning model;

generating, by the bot, a suggestion to perform a specific action, the generation of the suggestion to perform the specific action based on the prediction from the suggestion machine-learning model;

receiving, by the bot, a request of a user to perform the specific action;

programmatically determining, by the bot, that the specific action requires access to user data associated with the user;

causing, by the bot, a permission interface to be rendered, the permission interface enabling the user to approve access to user data associated with the user;

receiving, by the bot, a user input indicating approval of the access to the user data associated with the first user;

responsive to receiving the user input indicating approval of the access to the user data associated with the user, accessing, by the bot, the user data associated with the user; and responsive to accessing the user data associated with the user, performing the specific action.

78. The system of claim 77, wherein:

the user is a first user;

the specific action is related to a second user; and the operations further comprise:

obtaining, by the bot, permission from the second user to receive one or more messages from the bot; and sending, by the bot, the one or more messages to the second user to obtain information associated with the specific action, wherein performing the specific action occurs responsive to receiving, by the bot, the information associated with the specific action from the second user.

79. The system of claim 77, wherein the user is a first user, the operations further comprising:

obtaining, by the bot, permission from a second user to approve access to user data associated with the second user; and analyzing, by the bot, one or more messages between the first user and the second user, wherein the suggestion to perform the specific action is determined based on analyzing the one or more messages.

80. The system of claim 77, the operations further comprising:

obtaining, by the bot, permission from a second user to approve access to user data associated with the second user;

receiving, by the bot, an indication from the user that a conversation between the user and the second user is confidential; and abstaining from analysis, by the bot, of the conversation until the user or the second user reactivates the bot.

81. The system of claim 77, wherein the programmatically determining that the specific action requires access to the user data associated with the user is performed by a second machine-learning model, the second machine-learning model taking as an input at least the request of the user for the messaging application to perform the specific action.

82. The system of claim 77, wherein:

the suggestion machine-learning model takes as an input at least a content from a device associated with the user;

the content is based on a context of the user; and the context of the user comprises at least one of information on interactions of the user with one or more other users, one or more external conditions, one or more schedules of the user, or an activity of the user.

83. The system of claim 77, the operations further comprising performing, by the bot, the specific action in a particular style.

84. The system of claim 83, wherein the particular style comprises one of a formal style, a playful style, a neutral style, or an emoji style.

85. The system of claim 77, wherein the messaging application is accessed on the system, and:

the accessing of the messaging application comprises a virtual implementation of the messaging application; and the messaging application is implemented on a connected device, the connected device communicatively coupled to the system.

86. The system of claim 77, the operations further comprising, responsive to receiving the user input indicating approval of the access to the user data associated with the user, storing the user data in:

the memory of the system, wherein the messaging application is accessed on the system; or a memory of a connected device, wherein the connected device is communicatively coupled to the system.

87. The system of claim 77, wherein the messaging application is accessed on the system, wherein the system is one of:

a camera;

a laptop computer;

a tablet computer;

a mobile telephone;

a wearable device;

a mobile email device;

a portable game player payer;

a portable music player;

a reader device;

a head-mounted display;

a smartwatch;

a smart wristband;

headphones; or a first electronic device and a second electronic device, the first electronic device comprising the memory and communicatively coupled to the second electronic device, the second electronic device configured to receive the user input.

88. The system of claim 77, wherein the bot is in communication with one or more other messaging applications, the one or more other messaging applications different from the messaging application.

89. The system of claim 77, wherein the specific action is an action of a second bot, the second bot different from the bot.

90. The system of claim 89, wherein the second bot is not accessed by the messaging application.

91. The system of claim 77, wherein the specific action is providing one or more of an information, a travel function, a request for a taxi service, a coaching, a tutoring, an implementation of a game, a commerce action, or an interfacing.

92. The system of claim 91, wherein the information is based on an internet search.

93. The system of claim 91, wherein the travel function comprises:

a purchase of a ticket; or a making of a reservation.

94. The system of claim 91, wherein the interfacing comprises:

accessing a remote device; and performing a remote action on the remote device, the remote action on the remote device comprising one or more of:

chatting with the remote device;

retrieving information from the remote device; or providing instructions to the remote device.

95. The system of claim 94, wherein the remote device is a vehicle.

96. The system of claim 77, wherein the instructions further cause the one or more processors to determine, by the bot, an intent of the user, wherein the suggestion to perform the specific action is further based on the intent of the user.

97. The system of claim 96, wherein the determination of the intent of the user is based on a context of a conversation of the user.

98. The system of claim 77, wherein:

the instructions further cause the one or more processors to receive, by the messaging application, a command of the user to access a specific bot from among a plurality of available bots;

the bot comprises the specific bot from among the plurality of available bots; and the accessing of the bot is responsive to the command of the user.

99. The system of claim 98, wherein the command of the user to access the specific bot from among the plurality of available bots comprises one of a text input or a voice input.

100. The system of claim 77, wherein the request of the user to perform the specific action and the user input indicating approval of the access to the user data associated with the user are a same input from the user.

101. The system of claim 77, wherein:

the messaging application comprises a conversation between the user and at least one other person; and the instructions further cause the one or more processors to suggest, by the messaging application and in the conversation, an invocation of the bot.

102. The system of claim 77, wherein the user data is one or more of a location data, a payment information, or a contact information.

103. The system of claim 102, wherein:
the user data is the location data; and
the specific action is based on a proximity to a location, the location based on the location data.

104. The system of claim 103, wherein the suggestion to perform the specific action comprises a recommendation for a service within the proximity.

105. The system of claim 77, wherein the prediction is based at least in part on a natural language processing.

106. The system of claim 77, wherein:
the messaging application is accessed on the system; and
the suggestion to perform the specific action is a suggested response to a message in the messaging application, the message from a second user device.

107. The system of claim 77, wherein the specific action is a translation.

108. The system of claim 77, wherein the suggestion to perform the specific action comprises one or more of a text, an image, a link, an emoji, or a multimedia component.

109. The system of claim 77, further comprising one or more modules and wherein the performing of the specific action by the bot is performed by one of the one or more modules of the system, wherein the messaging application is accessed on the system, the module being different than the bot.

110. The system of claim 109, wherein the bot is a first bot and the one of the one or more modules is a second bot, the second bot:
implemented on the system; or
implemented on a connected device and accessed on the system, wherein the connected device is communicatively coupled to the system.

111. The system of claim 77, wherein:
the messaging application is implemented on the system; and
the bot is accessed on the system and implemented on a connected device, the connected device communicatively coupled to the system.

112. The system of claim 77, wherein:
the messaging application is implemented on the system; and
the bot is implemented on the system.

113. The system of claim 77, wherein:
the messaging application is accessed on the system and implemented on a connected device, the connected device communicatively coupled to the system; and
the bot is implemented on the system.

114. The system of claim 77, wherein:
the messaging application is accessed on the system and implemented on a connected device, the connected device communicatively coupled to the system; and
the bot is accessed on the system and implemented on the connected device.

* * * * *